(12) United States Patent
Noll et al.

(10) Patent No.: US 11,653,599 B2
(45) Date of Patent: May 23, 2023

(54) REMOTE INFEED DECK CLEANOUT DOOR FOR A HEADER

(71) Applicant: CNH Industrial America LLC, New Holland, PA (US)

(72) Inventors: Blaine R. Noll, Fleetwood, PA (US); Jeffrey D. Thomas, Gordonville, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 331 days.

(21) Appl. No.: 16/838,407

(22) Filed: Apr. 2, 2020

(65) Prior Publication Data
US 2020/0315091 A1 Oct. 8, 2020

Related U.S. Application Data

(60) Provisional application No. 62/828,207, filed on Apr. 2, 2019.

(51) Int. Cl.
*A01D 41/14* (2006.01)
*A01D 75/18* (2006.01)
*A01D 34/03* (2006.01)

(52) U.S. Cl.
CPC .......... *A01D 75/187* (2013.01); *A01D 34/03* (2013.01); *A01D 41/14* (2013.01)

(58) Field of Classification Search
CPC ..... A01F 12/16; A01D 41/14; A01D 41/1252; A01D 75/187; A01D 75/18; A01D 75/00; A01D 61/00
See application file for complete search history.

(56) References Cited

U.S. PATENT DOCUMENTS

| | | | |
|---|---|---|---|
| 1,862,159 A | 6/1932 | Paradise et al. | |
| 4,146,038 A * | 3/1979 | De Busscher | A01F 12/16 460/105 |
| 4,335,563 A * | 6/1982 | Rice | A01F 12/16 460/106 |
| 4,335,564 A * | 6/1982 | Knepper | A01F 12/16 460/106 |
| 4,538,625 A * | 9/1985 | Fortune | A01F 12/16 460/105 |
| 5,702,300 A * | 12/1997 | Wilson | A01F 12/16 460/106 |

(Continued)

FOREIGN PATENT DOCUMENTS

| | | |
|---|---|---|
| JP | H08266136 A | 10/1996 |
| JP | 2001275468 A | 10/2001 |
| JP | 2012170333 A | 9/2012 |

*Primary Examiner* — Adam J Behrens
(74) *Attorney, Agent, or Firm* — Peter Zacharias

(57) ABSTRACT

A cleaning system of a header for an agricultural vehicle. The header includes a frame with a floor having at least one cutout therein. The cleaning system includes at least one door, an elongated member operably connected to the at least one door, and at least one actuator connected to the elongated member. The elongated member is rotatable by the at least one actuator to slide the at least one door between a first position for covering the at least one cutout and a second position for at least partially uncovering the at least one cutout and allowing an unwanted material to pass through the at least one cutout.

20 Claims, 4 Drawing Sheets

(56) References Cited

U.S. PATENT DOCUMENTS

| | | | | |
|---|---|---|---|---|
| 5,882,257 | A * | 3/1999 | Cooksey | A01F 12/16 |
| | | | | 460/106 |
| 7,470,180 | B2 * | 12/2008 | Honey | A01D 41/16 |
| | | | | 56/10.2 J |
| 9,986,687 | B2 * | 6/2018 | Heyns | A01D 75/187 |
| 10,405,492 | B2 * | 9/2019 | Ricketts | A01F 12/16 |
| 2007/0028576 | A1 * | 2/2007 | Crego | A01F 12/16 |
| | | | | 56/10.2 J |
| 2008/0161077 | A1 * | 7/2008 | Honey | A01D 75/187 |
| | | | | 460/106 |
| 2020/0253124 | A1 * | 8/2020 | Honey | A01D 61/008 |

* cited by examiner

REMOTE INFEED DECK CLEANOUT DOOR FOR A HEADER

BACKGROUND OF THE INVENTION

The present invention pertains to headers and, more specifically, to an infeed door of an infeed deck of a header.

An agricultural harvester known as a "combine" is historically termed such because it combines multiple harvesting functions, such as picking, threshing, separating, and cleaning, in a single harvesting unit. Generally, a combine includes a chassis, a prime mover, a feeder housing, a header removably attached to the feeder housing for removing the crop from a field, a threshing system, and a cleaning system downstream of the threshing system. The threshing system may include an axially displaced threshing rotor and a perforated rotor housing, which can be composed of adjustable concaves. The threshing rotor is provided with rasp bars that interact with the crop material, and as the threshing rotor rotates within the rotor housing the threshing rotor performs a threshing operation on the crop material to remove the grain and provides positive crop movement. Once the grain is threshed, the grain falls through the perforations in the rotor housing and is subsequently cleaned by the cleaning system. The cleaning system includes a cleaning fan which blows air through oscillating sieves to discharge chaff and other debris toward the rear of the combine. Non-grain crop material or material other than grain (MOG), such as straw, from the threshing and cleaning systems proceeds through a straw chopper and out the rear of the combine. Clean grain is transported, by a clean grain auger, to a grain tank onboard the combine.

A typical header generally includes a frame, a pair of end dividers at the lateral ends of the frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a corn header which includes an auger and row units with snouts, gathering chains, and stalk rolls in order to harvest corn.

During operation of the header, the bottom floor or deck of the header may collect dust and debris as the crop material is transported from the header into the header. Thereby, to clean out the infeed deck and allow unwanted material to exit the infeed deck, a header may additionally include one or more cutouts and covers or hinged doors that selectively coverup the cutouts. The cleanout doors can be connected to the underside of the infeed deck, for example, by bolts, latches, and/or hinges. Generally, an operator must crawl underneath the header to remove each cleanout door. As can be appreciated, crawling under the header in order to clean out the infeed deck may be cumbersome and time-consuming.

What is needed in the art is a cost-effective and easy-to-use cleanout door to clean out the infeed deck of the header.

SUMMARY OF THE INVENTION

In one exemplary embodiment formed in accordance with the present invention, there is provided a header which generally includes a frame having a floor, with at least one cutout therein, and a cleaning system. The cleaning system includes at least one door for selectively covering the cutout, an elongated member operably coupled to the door, and at least one actuator coupled with the elongated member. The at least one door is slidable, by the at least one actuator rotating the elongated member, in between a first, closed position to prevent material from exiting the cutout of the floor and a second, open position in which the at least one door at least partially uncovers the cutout to allow unwanted material to pass through the cutout.

In another exemplary embodiment formed in accordance with the present invention, there is provided a cleaning system of a header for an agricultural vehicle. The header includes a frame with a floor having at least one cutout for allowing an unwanted material to pass therethrough. The cleaning system includes at least one door configured for slideably connecting to the floor of the frame and selectively covering the at least one cutout and an elongated member configured for rotatably connecting to the frame. The elongated member is operably connected to the at least one door. The cleaning system also includes at least one actuator connected to the elongated member. The elongated member is rotatable by the at least one actuator to slide the at least one door between a first position for covering the at least one cutout and a second position for at least partially uncovering the at least one cutout and allowing the unwanted material to pass through the at least one cutout.

In yet another exemplary embodiment formed in accordance with the present invention, there is provided a header for an agricultural vehicle. The header includes a frame having a floor with at least one cutout for allowing an unwanted material to pass therethrough. The header also includes a cleaning system connected to the frame. The cleaning system includes at least one door slideably connected to the floor of the frame and selectively covering the at least one cutout. The cleaning system also includes an elongated member rotatably connected to the frame. The elongated member is operably connected to the at least one door. The cleaning system also includes at least one actuator connected to the elongated member. The elongated member is rotatable by the at least one actuator to slide the at least one door between a first position for covering the at least one cutout and a second position for at least partially uncovering the at least one cutout and allowing the unwanted material to pass through the at least one cutout.

In yet another exemplary embodiment formed in accordance with the present invention, there is provided a method for cleaning a header for an agricultural vehicle. The header includes a frame with a floor having at least one cutout for allowing an unwanted material to pass therethrough. The method includes a step of providing a cleaning system. The cleaning system includes at least one door configured for slideably connecting to the floor of the frame and selectively covering the at least one cutout and an elongated member configured for rotatably connecting to the frame. The elongated member is operably connected to the at least one door. The cleaning system also includes at least one actuator connected to the elongated member. The method includes the further steps of rotating the elongated member, by the at least one actuator, to slide the at least one door into a closed position in which the at least one door covers the at least one cutout, and rotating the elongated member, by the at least one actuator, to slide the at least one door into an open position in which the at least one door uncovers the at least one cutout for allowing the unwanted material to pass through the at least one cutout.

One possible advantage of the exemplary embodiment of the remotely operated infeed door is that an operator or electronic control unit may easily and efficiently open or close the door without needing to crawl underneath the header to manually reposition the door.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the header and/or components thereof are usually determined with reference to the direction of forward operative travel of the header, but again, they should not be construed as limiting.

Figure 1:
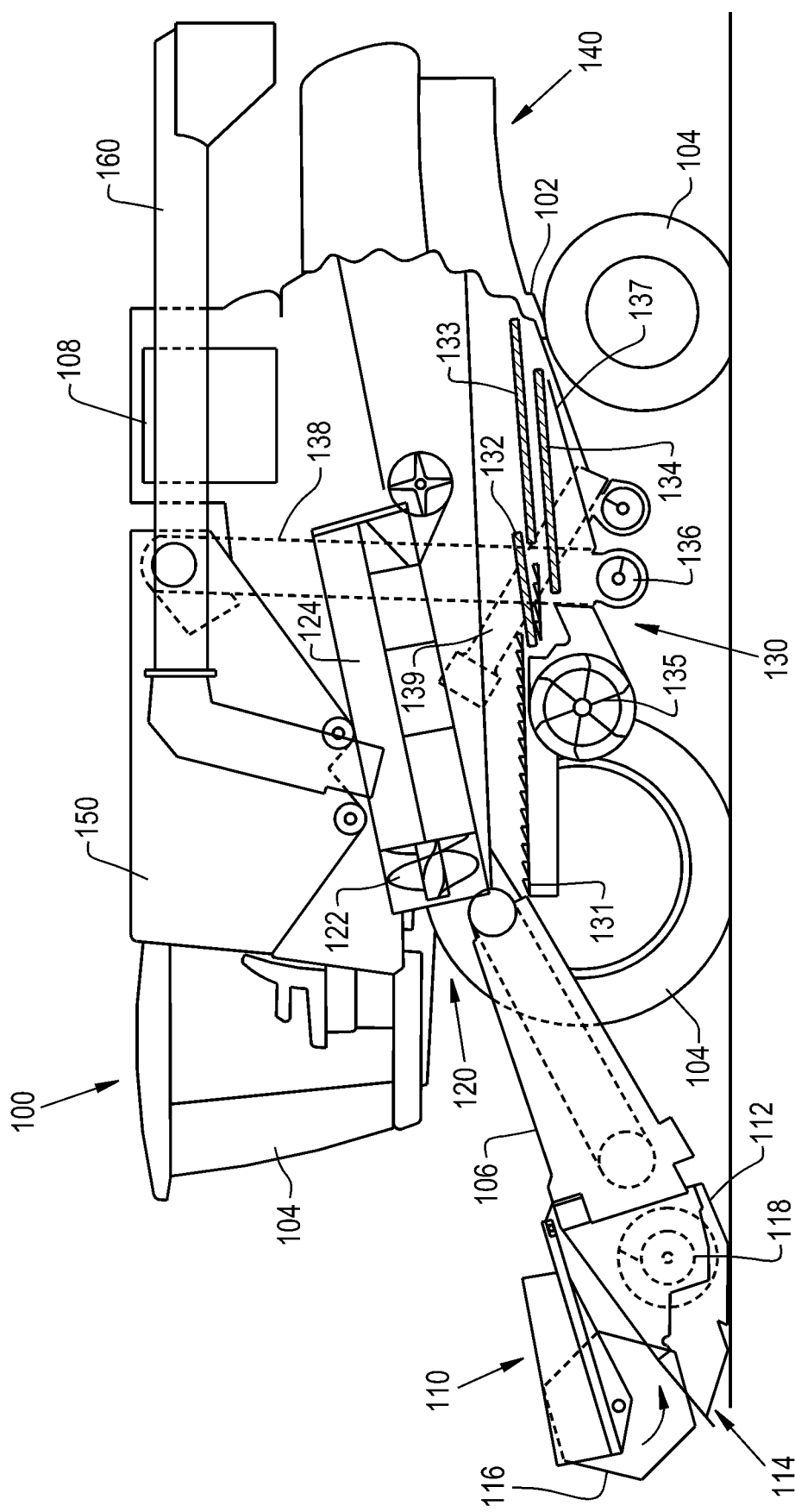
FIG. 1 illustrates a side view of an exemplary embodiment of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine 100. However, the agricultural vehicle 100 may be in the form of any desired agricultural vehicle 100, such as a windrower. The agricultural vehicle 100 generally includes a chassis 102, ground engaging wheels 104, a feeder housing 106, and a prime mover 108. The combine 100 may also include a header 110, a separating system 120, a cleaning system 130, a discharge system 140, an onboard grain tank 150, and an unloading auger 160. Although the agricultural vehicle 100 is shown as including wheels 104, in an alternative exemplary embodiment the agricultural vehicle 100 may include tracks, such as full tracks or half tracks.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and a conveyor 118, e.g. an auger 118 with fighting, that feeds the severed crop inwardly from each lateral end of the frame 112 toward feeder housing 106 or a draper belt. The header 110 may be in the form of any desired header, such as a draper header, auger head, or a corn header.

Figure 2:
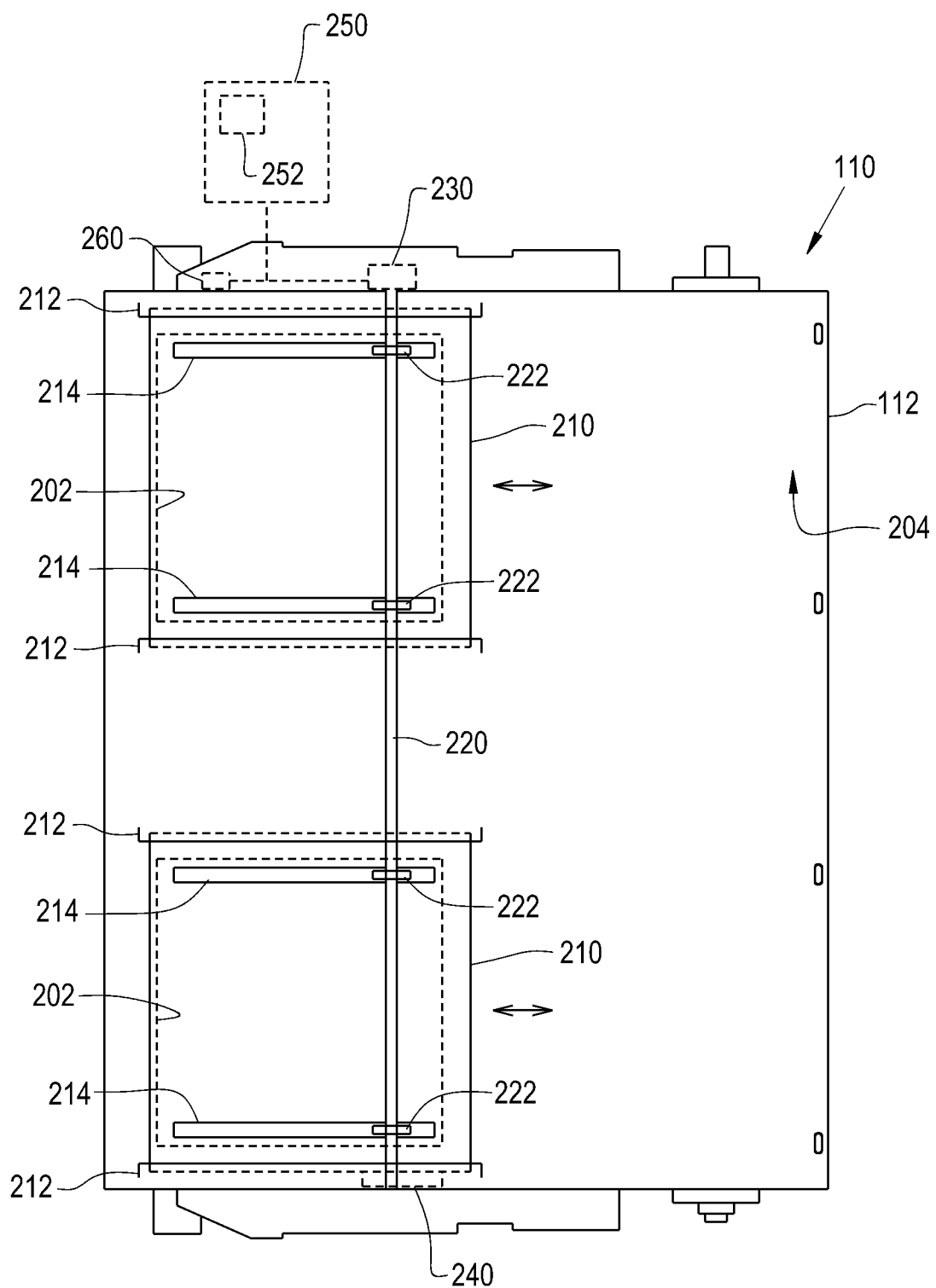
FIG. 2 illustrates a bottom view of an exemplary embodiment of the header including an infeed deck and at least one remotely operated infeed cleanout door, in accordance with an exemplary embodiment of the present invention.
Figure 3:
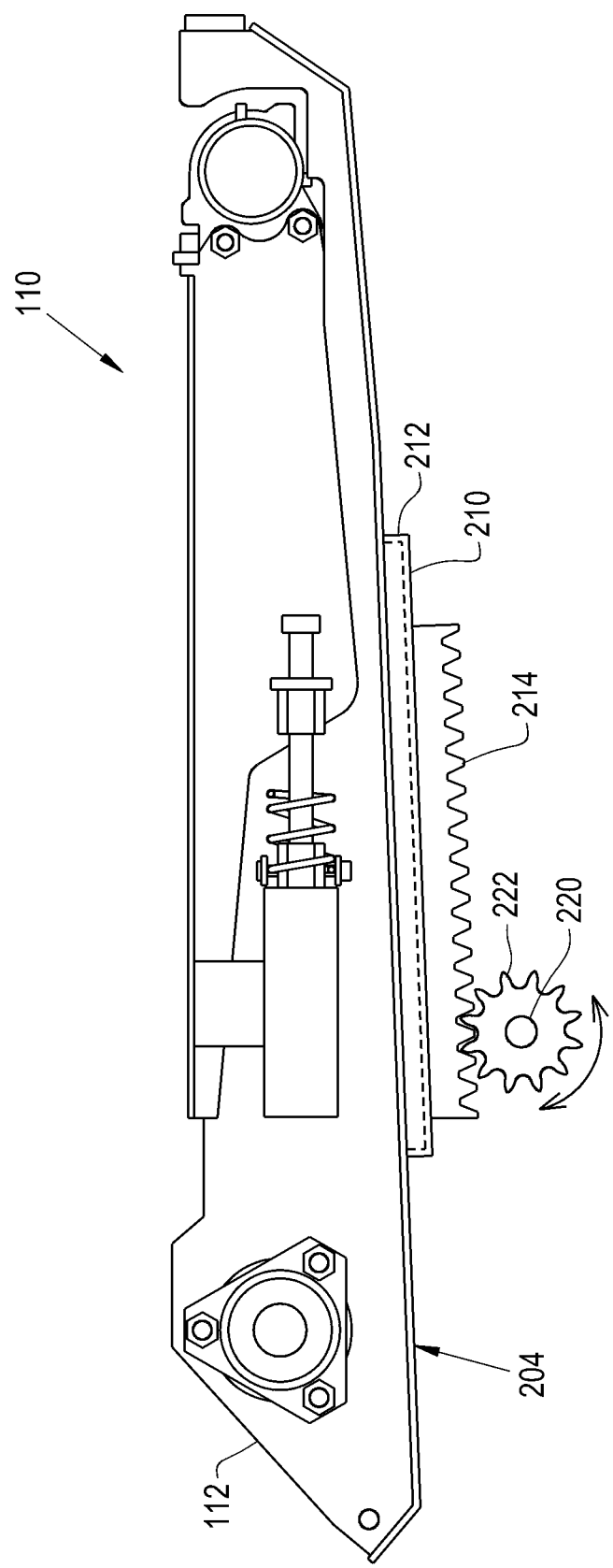
FIG. 3 illustrates a side view of the header of FIGS. 1-2.

Referring now collectively to FIGS. 2-3, the header 110 may additionally include a cleaning system 200 which generally includes at least one door 210, an elongated member 220 operably connected to the door 210, and at least one actuator 230, 240 operably connected to the elongated member 220. The cleaning system 200 may open and close each door 210 in order to selectively cover and expose a cutout 202 in the floor 204, e.g. infeed deck 204, of the frame 112. Thereby, the cleaning system 200 may move each door 210, as indicated by the bidirectional arrows in FIG. 2, in between a first, closed position for covering and preventing the crop material from passing through the cutout 202 and a second, open position for at least partially uncovering the cutout 202 and allowing an unwanted material, e.g. crop material, MOG, dust, debris, rocks, etc., to pass through the cutout 202.

As used herein, the term closed position may refer to any position or structural relationship between each door 210 and respective cutout 202 in which material cannot pass through the cutout 202, and the term open position may refer to any position or structural relationship between each door 210 and respective cutout 202 in which the unwanted material may pass through the cutout 202. Furthermore, as used herein, the terms cover and uncover in describing the relationship between each door 210 and respective cutout 202 may refer to the ability of each door 210, in any desired position, to prevent or allow the unwanted material to pass through the cutout 202, respectively.

Each door 210, e.g. infeed deck cleanout door 210, may be slideably connected to the floor 204 of the frame 112 and configured for selectively covering the cutout 202. For example, the cleaning system 200 may include a pair of tracks 212 for slideably connecting each door 210 to the floor 204 of the frame 112. Each track 212 may connect to the frame 112 and slideably mount opposing edges of each door 210. Additionally, for example, each track 212 may include ball bearings, or the like, to slideably connect each door 210 to the frame 112. The cleaning system 200 may include one, two, four, or more doors 210 which may each be associated with one or more corresponding cutout(s) 202. As shown, there are a pair of doors 210 that respectively cover a single cutout 202. Each door 210 may be solid or perforated, for example having through-holes in at least a portion of the body of the door 210. Each door 210 may be comprised of any desired material. It should be appreciated that each door 210 may cover or otherwise engage with each cutout 202 by selectively fitting within the perimeter of the cutout 202, overlapping on top of the cutout 202 and/or covering the bottom of the cutout 202. It should be appreciated that each door 210 may be incorporated as part of the cleaning system 200 or the header 110.

The elongated member 220 may be rotatably connected to the floor 204 of the frame 112 and operably connected to each door 210. The elongated member 220 may be in the form of a shaft or bar that extends transversely between the lateral ends of the frame. The elongated member 220 may be rotatably mounted onto the frame 112 at each end by a pair of arms that are connected to the frame 112. Each mounting arm may be in the form of a plate or bracket with a hole therethrough. Additionally, each mounting arm may include a bushing or ball bearing for rotatably supporting the elongated bar 220. The elongated member 220 may comprise any desired material, such as metal. As shown, the elongated member 220 is a uniform part; however, the elongated member 220 may be comprised of multiple sections which are respectively mounted to the frame 112.

Each actuator 230, 240 may be connected to the frame 112 and the elongated member 220 so that the elongated member 220 is rotatable by each actuator 230, 240 in order to slide each door 210 between the closed and open positions (FIG. 2). For instance, each actuator 230, 240 may be connected to a lateral end of the frame 112 and to an end of the elongated member 220. However, each actuator 230, 240 may be connected to the frame 112 and to the elongated member 220 at any desired location. The cleaning system 200 may include one, two, or more actuators 230, 240. Each actuator 230, 240 may be in the form of a motor 230 or a manual crank 240. For example, the cleaning system 200 may include the motor 230 connected to one end of the elongated member 220 as well as the manual crank 240 connected to the other end of the elongated member 220. The motor 230 may be actuated by an operator within the agricultural vehicle. The manual crank 240 may be manually operated by the operator. The motor 230 may be in the form of any desired motor, such as a hydraulic or electric motor. The manual crank 240 may be in the form of any desired crank, such as a lever with an arm. It should be appreciated that the cleaning system 200 may only include one actuator 230, 240, and may thereby only include the motor 230 or manual crank 240.

The cleaning system 200 may further include at least one rack 214 connected to each door 210 and at least one pinion 222 that is connected to the elongated member 220 and respectively associated with each rack 214. In this regard, the elongated member 220 may be operably connected to each door 210 by way of the gearing connection created by the rack 214 and pinion 222. Each pinion 222 is operably connected to each rack 214. Each rack 214 and pinion 222 may have any desired tooth profile in order to transfer the rotational motion of the elongated member 220 into linear motion for linearly sliding each door 210. As shown, each door 210 has two racks 214 that are respectively connected to two pinions 222 on the elongated member 220. However, each door 210 may have one, two, or more racks 214, and the elongated member 220 may have one, two, four, or more pinions 222.

In another exemplary embodiment, the agricultural vehicle 100, header 110, or cleaning system 200 may additionally include an electronic control unit (ECU) 250 and at least one sensor 260 (FIG. 2). In this regard, the ECU 250 may automatically open and close each door 210 via actuating the motor 230 upon receiving a feedback signal from the sensor 260 or a control command by the operator inputted via a user interface. It should be appreciated that the ECU 250 and sensor 260 may be incorporated as part of the infeed deck cleaning system 200.

The ECU 250 can be operably connected to the motor 230 and to the at least one sensor 260. The ECU 250 may also include a tangible computer readable medium, e.g. memory 252, for storing software code or instructions. The ECU 250 may be in the form of any desired ECU or controller. The ECU 250 may be incorporated into existing hardware and/or software of the agricultural vehicle 100 or header 110.

The sensor(s) 260 may be operably connected to the ECU 250 and connected to the frame 122, each door 210, and/or motor 230. Each sensor 260 may send a feedback signal to the ECU 250 such that the ECU 250 selectively actuates the motor 230 responsive to the signal provided by the sensor 260. The at least one sensor 260 can be in the form of any desired sensor(s), such as a proximity sensor, an optical sensor, and/or a position sensor. For instance, the header 110 may include an optical sensor 260 positioned within the header 110, e.g. connected to the inner wall of the frame 112, such that the optical sensor 260 senses a buildup of unwanted material in the header 110. In this regard, the ECU 250 may automatically actuate the motor 230 to selectively open each door upon the sensor 260 indicating a buildup of unwanted material within the header 100. It should be appreciated that the optical sensor 260 may be connected to the frame 112 at any desired location. Additionally or alternatively, one or more of the sensors 260 may be in the form of a position sensor, connected to each door 210 or integrated within the motor 230, for sensing whether the door 210 is in the closed or open position.

Figure 4:
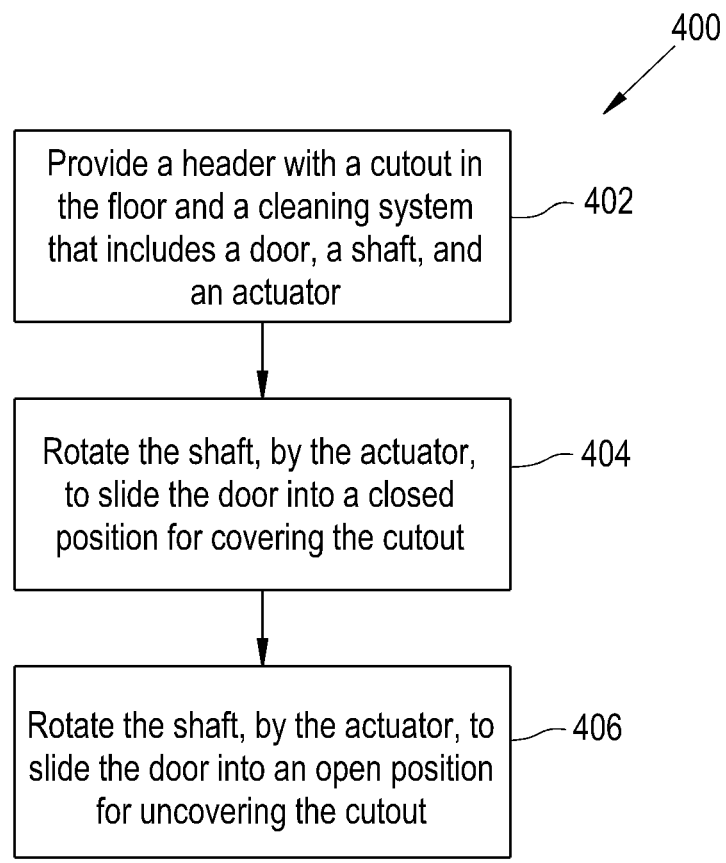
FIG. 4 illustrates a flow diagram of a method of cleaning out the infeed deck of the header, in accordance with an exemplary embodiment of the present invention.

Referring now to FIG. 4, there is shown a flow diagram of a method 400 for cleaning out the infeed deck 204 of the header 110. The method 400 may include an initial step of providing the header 110, as discussed above (at block 402). The method 400 may also include a step of rotating the elongated member 220, by actuating the at least one actuator 230, 240, to slide each door 210 into a first, closed position in which each door 210 covers the respective cutout 202 (at block 404). The method 400 may also include a step of rotating the elongated member 220, by actuating the at least one actuator 230, 240, to slide each door 210 into a second, open position in which each door 210 at least partially uncovers the respective cutout 202 for allowing the unwanted material to pass through the cutout(s) 202 in the floor 204 of the header 110 (at block 406). The method 400 may include a further step of actuating the motor 230, by the ECU 250, for rotating the elongated member 220 and sliding each door 210 to be in the closed position or open position. This method step may include sub-steps of sensing whether a buildup of unwanted material is within the header 110, by the sensor(s) 260, providing the feedback signal of the sensor 260, and then accordingly actuating the motor 230 by the ECU 250 in response to the feedback signal of the sensor 260 to open or close each door 210. As can be appreciated, the method 400 may be performed by an operator via manually adjusting the crank 240 or the ECU 250 via automatically actuating the motor 230 upon receiving a control command or the feedback signal from the sensor(s) 260.

It is to be understood that the steps of the method 400 may be performed by the controller 250 upon loading and executing software code or instructions. The controller 250 may include software code or instructions which are tangibly stored on the tangible computer readable medium 252. The computer readable medium 252 may be in the form of a magnetic medium, e.g., a computer hard drive, an optical medium, e.g., an optical disc, solid-state memory, e.g., flash memory, or other storage media known in the art. Thus, any of the functionality performed by the controller 250 described herein may be implemented in software code or instructions which are tangibly stored on the tangible computer readable medium 252. The controller 250 loads the software code or instructions via a direct interface with the computer readable medium 252 or via a wired and/or wireless network. Upon loading and executing such software code or instructions by the controller 250, the controller 250 may perform any of the functionality described herein.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A cleaning system of a header for an agricultural vehicle, the header comprising a frame with a floor having at least one cutout for allowing an unwanted material to pass therethrough, the cleaning system comprising:
at least one door configured for slideably connecting to the floor of the frame and selectively covering the at least one cutout, the at least one door being slidable bidirectionally in a forward direction and a rearward direction, each direction being with reference to a forward direction of operative travel of the header;
an elongated member configured for rotatably connecting to the frame and the elongated member is operably connected to the at least one door, the elongated member extending transversely with reference to the forward direction of operative travel of the header between lateral ends of the frame; and
at least one actuator connected to the elongated member such that the elongated member is rotatable by the at least one actuator to slide the at least one door between a first position for covering the at least one cutout and a second position for at least partially uncovering the at least one cutout and allowing the unwanted material to pass through the at least one cutout.

2. The cleaning system of claim 1, further comprising at least one rack connected to the at least one door.

3. The cleaning system of claim 2, further comprising at least one pinion connected to the elongated member and operably coupled with the at least one rack.

4. The cleaning system of claim 3, wherein the at least one door comprises two doors, the at least one rack comprises four racks with two racks respectively connected to each door, and the at least one pinion comprises four pinions each connected to the elongated member and operably coupled with each rack.

5. The cleaning system of claim 1, wherein the at least one actuator comprises one of a motor and a manual crank.

6. The cleaning system of claim 1, further comprising a pair of tracks for slideably connecting the at least one door to the frame, and each track being configured for connecting to the frame and slideably mounting the at least one door.

7. The cleaning system of claim 1, further comprising an electronic control unit operably connected to the at least one actuator and configured for selectively actuating the at least one actuator.

8. The cleaning system of claim 7, further comprising at least one sensor operably connected to the electronic control unit, the at least one sensor is configured for connecting to the frame, and the at least one sensor provides a signal to the electronic control unit, the at least one sensor sensing a buildup of unwanted material in the header.

9. A header for an agricultural vehicle, comprising:
a frame comprising a floor with at least one cutout for allowing an unwanted material to pass therethrough; and
a cleaning system connected to the frame, and comprising:
at least one door slideably connected to the floor of the frame for selectively covering the at least one cutout, the at least one door being slidable bidirectionally in a forward direction and a rearward direction, each direction being with reference to a forward direction of operative travel of the header;
an elongated member rotatably connected to the frame and operably connected to the at least one door, the elongated member extending transversely with reference to the forward direction of operative travel of the header between lateral ends of the frame; and
at least one actuator connected to the elongated member such that the elongated member is rotatable by the at least one actuator to slide the at least one door between a first position for covering the at least one cutout and a second position for at least partially uncovering the at least one cutout and allowing the unwanted material to pass through the at least one cutout.

10. The header of claim 9, wherein the cleaning system further comprises at least one rack connected to the at least one door.

11. The header of claim 10, wherein the cleaning system further comprises at least one pinion connected to the elongated member and operably coupled with the at least one rack.

12. The header of claim 11, wherein the at least one door comprises two doors, the at least one rack comprises four racks with two racks respectively connected to each door, and the at least one pinion comprises four pinions each connected to the elongated member and operably coupled with each rack.

13. The header of claim 9, wherein the at least one actuator comprises one of a motor and a manual crank.

14. The header of claim 9, wherein the cleaning system further comprises a pair of tracks for slideably connecting the at least one door to the frame, and each track being configured for connecting to the frame and slideably mounting the at least one door.

15. The header of claim 9, further comprising an electronic control unit operably connected to the at least one actuator and configured for selectively actuating the at least one actuator.

16. The header of claim 15, further comprising at least one sensor operably connected to the electronic control unit, the at least one sensor is connected to the frame, and the at least one sensor provides a signal to the electronic control unit, the at least one sensor sensing a buildup of unwanted material in the header.

17. A method for cleaning a header for an agricultural vehicle, the header comprising a frame with a floor having at least one cutout for allowing an unwanted material to pass therethrough, comprising:

providing a cleaning system connected to the frame, and comprising at least one door configured for slideably connecting to the floor of the frame and selectively covering the at least one cutout, an elongated member configured for rotatably connecting to the frame and the elongated member is operably connected to the at least one door, and at least one actuator connected to the elongated member, the at least one door being slidable bidirectionally in a forward direction and a rearward direction, each direction being with reference to a forward direction of operative travel of the header, the elongated member extending transversely with reference to the forward direction of operative travel of the header between lateral ends of the frame;

rotating the elongated member, by the at least one actuator, to slide the at least one door into a closed position in which the at least one door covers the at least one cutout; and rotating the elongated member, by the at least one actuator, to slide the at least one door into an open position in which the at least one door uncovers the at least one cutout for allowing the unwanted material to pass through the at least one cutout.

18. The method of claim 17, wherein the cleaning system comprises at least one rack connected to the at least one door and at least one pinion connected to the elongated member and operably coupled with the at least one rack.

19. The method of claim 17, wherein the at least one actuator comprises at least one of a motor and a manual crank.

20. The method of claim 17, wherein the cleaning system further comprises an electronic control unit operably connected to the at least one actuator and at least one sensor operably connected to the electronic control unit, the at least one sensor provides a signal to the electronic control unit, and the method comprises a further step of actuating the at least one actuator, by the electronic control unit, for rotating the elongated member and sliding the at least one door in one of the closed position and open position, the at least one sensor sensing a buildup of unwanted material in the header.

* * * * *